(12) United States Patent
VanderDrift

(10) Patent No.: US 9,639,707 B1
(45) Date of Patent: May 2, 2017

(54) SECURE DATA STORAGE AND COMMUNICATION FOR NETWORK COMPUTING

(76) Inventor: Richard W. VanderDrift, Larkspur, CA (US)

( * ) Notice: Subject to any disclaimer, the term of this patent is extended or adjusted under 35 U.S.C. 154(b) by 0 days.

(21) Appl. No.: 12/987,755

(22) Filed: Jan. 10, 2011

Related U.S. Application Data

(63) Continuation-in-part of application No. 12/769,507, filed on Apr. 28, 2010, now abandoned.

(60) Provisional application No. 61/335,866, filed on Jan. 14, 2010.

(51) Int. Cl.
*G06F 21/62* (2013.01)
*H04L 29/06* (2006.01)

(52) U.S. Cl.
CPC .......... *G06F 21/62* (2013.01); *G06F 21/6209* (2013.01); *H04L 63/0428* (2013.01)

(58) Field of Classification Search
None
See application file for complete search history.

(56) References Cited

U.S. PATENT DOCUMENTS

| | | |
|---|---|---|
| 5,752,242 A | 5/1998 | Havens |
| 5,794,006 A | 8/1998 | Sanderman |
| 6,016,394 A | 1/2000 | Walker |
| 6,442,545 B1 | 8/2002 | Feldman et al. |
| 6,668,325 B1 | 12/2003 | Collberg et al. |
| 7,031,957 B2 | 4/2006 | Harris |
| 7,089,237 B2 | 8/2006 | Turnbull et al. |
| 7,111,229 B2 | 9/2006 | Nicholas et al. |
| 7,325,193 B2 | 1/2008 | Edd et al. |
| 7,493,329 B2 | 2/2009 | McMullen et al. |
| 7,502,795 B1 | 3/2009 | Svendsen et al. |
| 7,584,268 B2 | 9/2009 | Kraus et al. |
| 7,634,735 B2 | 12/2009 | McCary |
| 7,653,870 B1 * | 1/2010 | Knauft et al. ................ 715/205 |
| 7,676,505 B2 | 3/2010 | Chess et al. |
| 7,797,274 B2 | 9/2010 | Strathearn et al. |
| 7,831,579 B2 | 11/2010 | Wade et al. |

(Continued)

OTHER PUBLICATIONS

Oracle, DBMS_OBFUSCATION_TOOLKIT, 2008, Oracle, Oracle® Database PL/SQL Packages and Types Reference 11g Release 1 (11.1), pp. 1.1-1.20.

(Continued)

*Primary Examiner* — Izunna Okeke
*Assistant Examiner* — Malcom Cribbs

(57) ABSTRACT

A method comprising the steps of receiving a data object, obfuscating the meaning of at least a portion of the data and transmitting the data to a second processor-controlled device. In some embodiments the data may be formatted as either a spreadsheet or an XML file and the obfuscation process may operate on the elements and the attributes of the XML file. The obfuscating may include replacing meaningful data with identifiers before transmitting them to another client device or a server. In response, the other client device or server may operate on the data and return it, or optionally return code or applets to be executed on the client device. Some embodiments allow for a server or other client device to access remote resources for use when processing the data. The client devices may be cellular telephones or other smart devices including portable computers and tablets.

12 Claims, 3 Drawing Sheets

(56) References Cited

U.S. PATENT DOCUMENTS

| | | |
|---|---|---|
| 7,900,149 B2 | 3/2011 | Hatcher et al. |
| 7,904,450 B2 | 3/2011 | Wilson |
| 7,954,052 B2 | 5/2011 | Curtis et al. |
| 8,074,202 B2 | 12/2011 | Da Palma et al. |
| 8,219,900 B2 | 7/2012 | Curtis et al. |
| 2001/0019614 A1* | 9/2001 | Madoukh ............... 380/277 |
| 2002/0077985 A1* | 6/2002 | Kobata et al. ............ 705/51 |
| 2002/0143812 A1 | 10/2002 | Bedingfield |
| 2003/0046363 A1 | 3/2003 | Ezato |
| 2003/0046572 A1 | 3/2003 | Newman et al. |
| 2003/0050976 A1 | 3/2003 | Block et al. |
| 2003/0063770 A1 | 4/2003 | Svendsen et al. |
| 2003/0225853 A1 | 12/2003 | Wang et al. |
| 2004/0039795 A1 | 2/2004 | Percival |
| 2004/0088647 A1 | 5/2004 | Miller et al. |
| 2004/0117621 A1 | 6/2004 | Knight |
| 2004/0167989 A1 | 8/2004 | Kline et al. |
| 2004/0215830 A1* | 10/2004 | Shenfield ............. H03M 7/30 709/246 |
| 2004/0260933 A1 | 12/2004 | Lee |
| 2005/0027795 A1 | 2/2005 | San Andres et al. |
| 2005/0055424 A1 | 3/2005 | Smith |
| 2005/0091367 A1 | 4/2005 | Pyhalammi et al. |
| 2005/0120288 A1 | 6/2005 | Boehme et al. |
| 2005/0160359 A1 | 7/2005 | Falk et al. |
| 2005/0192881 A1 | 9/2005 | Scannell |
| 2005/0223061 A1 | 10/2005 | Auerbach et al. |
| 2005/0246283 A1 | 11/2005 | Gwiazda et al. |
| 2005/0262210 A1 | 11/2005 | Yu |
| 2005/0262439 A1 | 11/2005 | Cameron |
| 2005/0273489 A1 | 12/2005 | Pecht et al. |
| 2005/0273503 A1 | 12/2005 | Carr et al. |
| 2005/0273702 A1 | 12/2005 | Trabucco |
| 2006/0149567 A1 | 7/2006 | Muller et al. |
| 2006/0179075 A1 | 8/2006 | Fay |
| 2006/0218159 A1 | 9/2006 | Murphy et al. |
| 2006/0224952 A1 | 10/2006 | Lin |
| 2006/0236231 A1 | 10/2006 | Allen et al. |
| 2007/0011453 A1 | 1/2007 | Tarkkala et al. |
| 2007/0162459 A1 | 7/2007 | Desai et al. |
| 2007/0168859 A1 | 7/2007 | Fortes |
| 2007/0169165 A1 | 7/2007 | Crull et al. |
| 2007/0180240 A1 | 8/2007 | Dahl |
| 2007/0244906 A1 | 10/2007 | Colton et al. |
| 2008/0005284 A1 | 1/2008 | Ungar et al. |
| 2008/0010387 A1 | 1/2008 | Curtis et al. |
| 2008/0010609 A1 | 1/2008 | Curtis et al. |
| 2008/0071804 A1 | 3/2008 | Gunda et al. |
| 2008/0071901 A1 | 3/2008 | Adelman et al. |
| 2008/0107264 A1 | 5/2008 | Van Wie et al. |
| 2008/0208912 A1 | 8/2008 | Garibaldi |
| 2008/0209345 A1 | 8/2008 | Cannata et al. |
| 2008/0222308 A1 | 9/2008 | Abhyanker |
| 2008/0229211 A1 | 9/2008 | Herberger et al. |
| 2008/0240425 A1* | 10/2008 | Rosales ............... G06F 21/6254 380/28 |
| 2008/0243852 A1 | 10/2008 | Brunner et al. |
| 2008/0270406 A1 | 10/2008 | Flavin et al. |
| 2008/0313260 A1 | 12/2008 | Sweet et al. |
| 2008/0319762 A1 | 12/2008 | Da Palma et al. |
| 2009/0007274 A1 | 1/2009 | Martinez et al. |
| 2009/0019366 A1 | 1/2009 | Abhyanker |
| 2009/0019367 A1 | 1/2009 | Cavagnari et al. |
| 2009/0055755 A1 | 2/2009 | Hicks et al. |
| 2009/0070426 A1 | 3/2009 | McCauley et al. |
| 2009/0100041 A1 | 4/2009 | Wilson |
| 2009/0119515 A1 | 5/2009 | Nicolson et al. |
| 2009/0187830 A1 | 7/2009 | Jorasch et al. |
| 2009/0265607 A1 | 10/2009 | Raz et al. |
| 2010/0125798 A1 | 5/2010 | Brookhart |
| 2011/0083090 A1 | 4/2011 | Gwiazda et al. |
| 2011/0239132 A1 | 9/2011 | Jorasch et al. |
| 2011/0307519 A1 | 12/2011 | Payzer et al. |

OTHER PUBLICATIONS

Oracle Forms Services and Oracle Form Developer 11g Technical Overview. Jun. 2009. Author Jan Carlin. Retrieved from http://www.oracle.com/technetwork/developer-tools/forms/overview/technical-overview-130127.pdf on Jan. 14, 2013. pp. 1-22.

Oracle® Coherence Developer's Guide. Release 3.7.1 Part No. E22837-01. Functional Descriptions. Chapter 1 © 2008. Retrieved from http://docs.oracle.com/cd/E24290_01/coh.371/e22837/gs_intro.htm#BABDDBAD on Jan. 14, 2013. 9 pages.

Oracle® Coherence Developer's Guide. Release 3.7.1 Part No. E22837-01. Functional Descriptions. Chapter 3 © 2008. Retrieved from http://docs.oracle.com/cd/E24290_01/coh.371/e22837/gs_config.htm#CEGJBDJD on Jan. 14, 2013. 22pages.

Filemaker® Pro 12. User's Guide. Chapter 4. Retrieved from http://www.filemaker.com/support/product/docs/12/fmp/fmp12_users_guide.pdf on Jan. 14, 2013. pp. 100-114.

Filemaker® Pro 12. User's Guide. Chapter 4. Retrieved from http://www.filemaker.com/support/product/docs/12/fmp/fmp12_instant_web_publish_en.pdf on Jan. 14, 2013., pp. 26-37.

vFabric GemFire User's Guide Retrieved from http://pubs.vmware.com/vfabric52/topic/com.vmware.ICbase/PDF/vfabric-gemfire-ug-6.6.4.pdf on Jan. 14, 2013. 756 pages.

* cited by examiner

SECURE DATA STORAGE AND COMMUNICATION FOR NETWORK COMPUTING

PRIORITY

This application claims the benefits of U.S. Provisional Patent Application 61/335,866 entitled Secure, Confidential Data in a Software as a Service and Cloud Computing Environment filed on Jan. 14, 2010 and U.S. patent application Ser. No. 12/769,507 filed on Apr. 28, 2010, both of which are included herein in their entirety by reference.

TECHNICAL FIELD

The present disclosure relates generally to data security and more particularly to a secure system and method for network-based, real-time data processing and transfer.

BACKGROUND

When using a third party service provider to host an application that has sensitive data that must be secured or remain confidential, there is always the concern that the data is under the control of or on the premises of another party. The current disclosure is unique in that it supports using third party hosting services without any security and confidentiality compromises. This is ideal for applications that are best hosted on servers, such as cross-enterprise collaboration applications and applications used by businesses that cannot or do not want to invest in and maintain complex technology infrastructure. Medical records applications are one such an example as many doctor practices and clinics have the need to share medical information as well as have limited technical expertise.

Some examples of application domains that would greatly benefit from the current disclosure include:

Health records—Over an individual's life many health care providers store a record of medical events as well as review part of a person's complete medical history.

Personal information management—Many people have a diverse set of data intensive activities, events, and assets they need to track. Accounts, warranties, visas, insurance, vehicles, properties, accreditations are a few such examples.

Tax and Income information—There is an increased need to keep tax and income information under the personal control of the person or entity to which it applies because of the risk of fraud or identity theft.

Military operations—Militaries have come to rely on having virtually all their assets and personnel, each with their own data and computing power, in continuous communications. For example, planes, tanks and soldiers acquire data for decision making. This data is transmitted to control units that are continually sending information and instructions to other units. It is critical that communications are secure even after one of the assets and its computing resources might have been acquired by an enemy or after a communication channel and its encryption keys compromised.

Traditional architectures store data on a server that may be accessed by one or more clients. Changes made by a client are persisted on the server and sent to the clients or made available to the clients when they make a data request. When the data management tier is a relational database, the server owner and those who have been granted access privileges control the data. For example, the technical database administrators create data views for some classes of users thus restricting access to other classes of users. In a database with a large volume of data and many tables, managing data access controls for each user and each object is extremely time consuming and error prone.

As such, what is needed is a processing and data transmission system where the client does not need to entrust a $3^{rd}$ party with control of the client's data and does not require remote storage of confidential information.

SUMMARY

Disclosed herein is a method comprising the steps of receiving a data object, obfuscating the meaning of at least a portion of the data and transmitting the data to a second processor-controlled device. In some embodiments the data object may be formatted as either a spreadsheet or an XML file and the obfuscation process may operate on the elements and the attributes of the XML file. The obfuscating includes replacing meaningful data with identifiers before transmitting them to another client device or a server. In response, the other client device or server may operate on the data and return it, or optionally return code or applets to be executed on the client device. Some embodiments allow for a server or other client device to access remote resources for use when processing the data. The client devices may be cellular telephones or other smart devices including portable computers and tablets.

DETAILED DESCRIPTION

Generality of Invention

Figure 1:
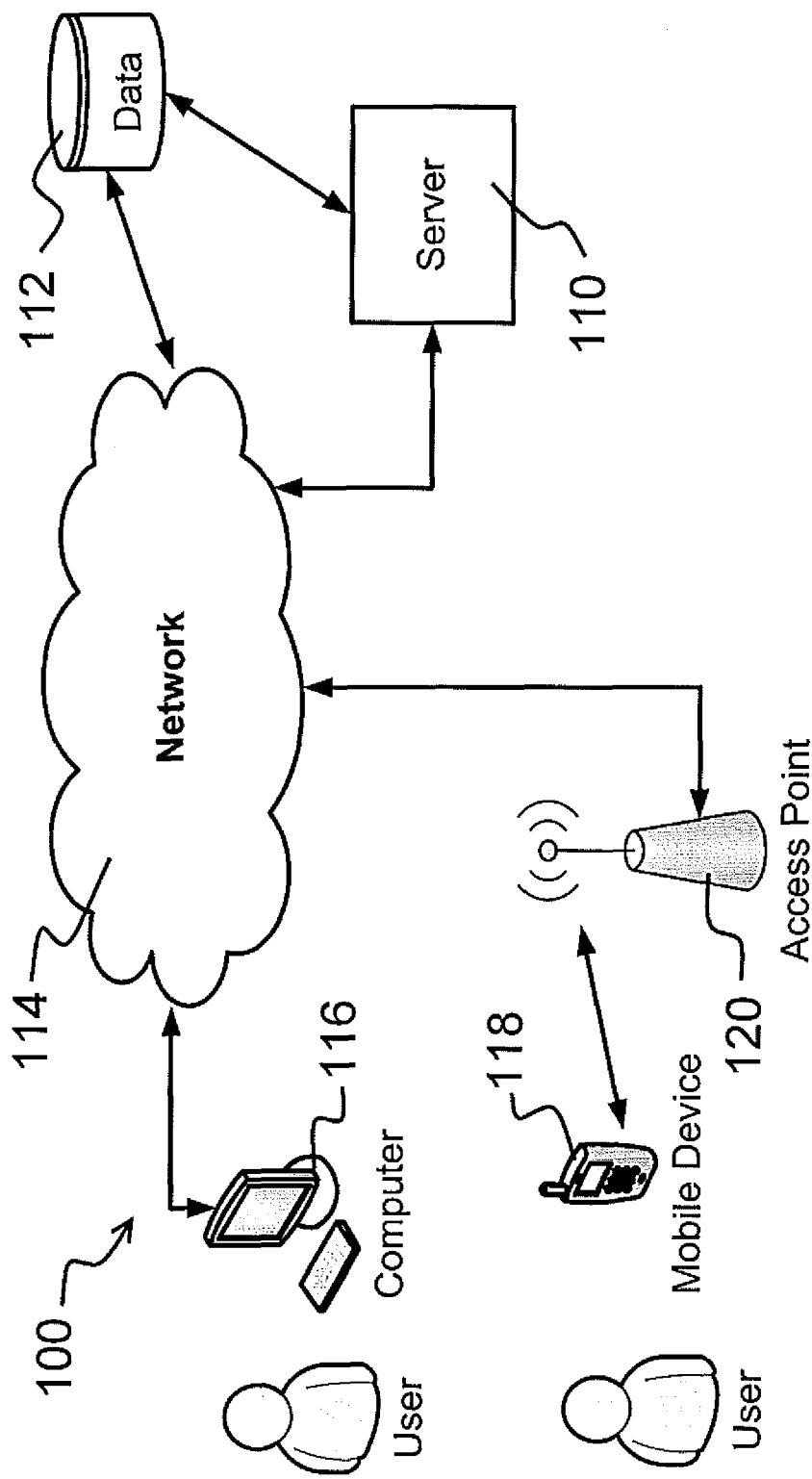
FIG. 1 shows a functional block diagram of a client server system.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. The examples listed herein are solely to illustrate concepts of this disclosure are not limiting. Many other variations are possible which remain within the content, scope and spirit of the invention, and these variations would become clear to those skilled in the art after perusal of this application.

Lexicography

The phrase "extensible markup language" or "XML" generally refers to a set of rules for encoding documents in machine-readable format. These rules provide for portions of documents described generally as elements. Elements may be further described by having an associated attribute.

The word "Attribute" generally refers to an additional item in an XML file that provides for additional information about elements. Attributes often provide information that is not a part of the data for example a file type may be an attribute of an element. However, file type is irrelevant to the element itself, but may be important to any software that wants to manipulate the element The phrase "simple element" generally refers to an XML element that contains only text. The text can be of many different types including but not limited to one of the types included in a XML schema definition such as Boolean, string, date, etc., or it can be a custom type specified for a specific application. Simple elements cannot have attributes. If an element has attributes, it is considered to be of a complex type.

The word "reference" generally refers to a value directing or pointing to another location for the source of data. A reference can be explicit such as the IDs of other objects and pointers to other objects. Or they can be implicit by their being imbedded in an object such as an object "deep copied" into an object or a complex element that is deeper in a document or record hierarchy.

The word "AJAX" generally refers to a group of interrelated web development techniques used on the client-side to create interactive web applications. With Ajax, web applications can retrieve data from the server asynchronously in the background without interfering with the display and behavior of the existing page. The use of XML is not actually required, and the requests do not need to be asynchronous.

The word "Flex" generally refers to a group of interrelated web development techniques used in client server applications. Adobe Flex is a software development kit (SDK) released by Adobe Systems for the development and deployment of cross-platform rich Internet applications based on the Adobe Flash platform.

The phrases "Software as a service", "SaaS" or "software on demand" generally refer to software that is deployed over the internet and/or is deployed to run behind a firewall on a local area network or personal computer. With SaaS, a provider licenses an application to customers either as a service on demand, through a subscription, in a "pay-as-you-go" model, or (increasingly) at no charge. This approach to application delivery is part of the utility computing model where all of the technology is in the "cloud" accessed over the Internet as a service.

The phrase "globally unique identifier," "ID" or "GUID" generally refers to the type of identifier used in software applications to provide a unique reference number. The identifier is often represented as a 32 character hexadecimal string, such as {21EC2020-3AEA-1069-A2DD-08002B30309D} and usually stored as a 128 bit integer. The term GUID usually, but not always, refers to Microsoft's implementation of the Universally Unique Identifier (UUID) standard, thus other operating systems and software applications may effectuate the same or similar result using different terminology.

System Elements

Processing System

The methods and techniques described herein may be performed on a processor based device. The processor based device will generally comprise a processor attached to one or more memory devices. These memory devices will be operable to provide instructions to the processors, and to store data, including data acquired from remote servers. The processor will also be coupled to various input/output (I/O) devices for receiving input from a user or another system and for providing an output to a user or another system. These I/O devices include human interaction devices such as keyboard, touchscreens, displays and terminals as well as remote connected computer systems, modems, radio transmitters and handheld communication devices such as cellular phones and digital assistants.

The processing system may also include mass storage devices such as disk drives and flash memory modules as well as connections through I/O devices to servers containing additional storage devices and peripherals. The I/O may also include network interfaces, modems and radio transceivers. The inventor contemplates that the methods disclosed herein will operate over a network such as the Internet, and may be effectuated using combinations of several processing devices, memories and I/O.

In addition the processing system may be a wireless devices such as a smart phone, personal digital assistant (PDA), laptop, notebook and tablet computing devices operating through wireless networks. These wireless devices may include a processor, memory coupled to the processor, displays, keypads, WiFi, Bluetooth, GPS and other I/O functionality.

Client Server Processing

FIG. 1 shows a functional block diagram of a client server system 100. In the FIG. 1 a server 110 is coupled to one or more databases 112 and to a network 114. A user accesses the server by a computer 116 communicably coupled to the network 114. Alternatively the user may access the server 110 through the network 114 by using a smart device such as a telephone or PDA 118. The smart device 118 may connect to the server 110 through an access point 120 coupled to the network 114.

Conventionally, client server processing operates by dividing the processing between two devices such as a server and a second smart device such as a cell phone or other computing device. The workload is divided between the servers and the clients according to a predetermined specification. For example in a "light client" application, the server does most of the data processing and the client does a minimal amount of processing, often merely displaying the result of processing performed on a server.

According to the current disclosure, client-server applications are structured so that the server provides machine-readable instructions to the client device and the client device executes those instructions. The interaction between the server and client indicates which instructions are transmitted and executed. In addition, the client may, at times, provide for machine readable instructions to the server, which in turn executes them. Several forms of machine readable instructions are known in the art including applets and are written in a variety of languages including Java and JavaScript.

Client-server applications also provide for software as a service (SaaS) applications where the server provides software to the client on an as needed basis.

In addition to the transmission of instructions, client-server applications also include transmission of data between the client and server. Often this entails data, stored on the client, to be transmitted to the server for processing. The resulting data is then transmitted back to the client for display or further processing.

One having skill in the art will recognize that client devices may be communicably coupled to a variety of other devices and systems such that the client receives data directly and operates on that data before transmitting it to other devices or servers. Thus data to the client device may come from input data from a user, from a memory on the device, from an external memory device coupled to the device, from a radio receiver coupled to the device or from a transducer coupled to the device. The radio may be part of a wireless communications system such as a "WiFi" receiver. Transducers may be any of a number of devices or instruments such as thermometers, pedometers, health measuring devices and the like.

Core Concepts

In accordance with the current disclosure the strategy is uniquely suited to an emerging class of applications where the data is shared or jointly owned by multiple organizations, or where the users are technically unsophisticated but their data needs are complex. Never does the owner of the data have to trust the software service with sensitive data.

The system meets confidentiality and security objectives by providing the ability to use hosted computing services to perform traditional hosting service functions for multi-user applications except that the hosting computer service never works with meaningful or sensitive data that is unencrypted. The data used by the hosting computer server may be in either encrypted or unencrypted format, however when unencrypted data is employed its meaning is obscured according to the techniques employed herein.

One or more of the following core concepts may be employed:

- All confidential objects have non-meaningful identifiers thus preventing disclosure of the value of the object. For example a user name would be replaced by an identifier such as a GUID so only certain devices will have meaningful information.
- The attribute values of confidential objects are always encrypted or obfuscated when not being used by an authorized user. The hosting service is not one of the authorized users; therefore a hosting service will not generally have access to the confidential objects.
- The hosting service uses the non-meaningful object identifiers and data management rules to organize the object identifiers for attached clients. This provides for structured data comprised of non-meaningful object identifiers to be used according to the current disclosure. The structured data may be in the form of an XML file, a spreadsheet or other format. For example an XML file may define the structure of the record or recordset, but the elements of the XML file would be object identifiers or IDs.
- The authorized clients decrypt the attribute values and attach them to the organized object identifiers to create the complete record. The decryption and attachment may be in accordance with the above mentioned structured data.
- The hosting service manages changes to the object relationships, however, it does not manage changes to object attribute values or element values. For example, a hosting service may process an XML file that contains records, but the elements of the record are identifiers and not the actual data of the record.
- The hosting service uses requests from the client to organize the objects.
- The hosting service uses object relationship changes sent from the client to organize the objects it is managing.
- The hosting service transmits the organized objects and changes to the organization of the objects to the clients.
- The clients add the unencrypted confidential object attribute values to the organized objects from the server at the client device.
- The client with attribute values encrypts and sends some or all of those attribute values to other clients.
- The client encrypts the attribute values changes and sends those changes to the other clients or to the server for distribution to the other clients attached to the server.

The core concepts and techniques described herein are particularly suited for multi-tier application architecture. The decrypted data stored on the hosted computing service are unintelligible IDs and keys that are used to organize data. The actual element or attribute values that convey human intelligible information are never stored or available on the hosted service in an unencrypted form. Even when a user is connected to the hosted service from a GUI application, sensitive data is not temporarily on the server in a persistent store or in computer memory.

The above mentioned core concepts will be further illustrated in the following examples.

Operational Examples

Opening a Secure Data Structure

Figure 2:
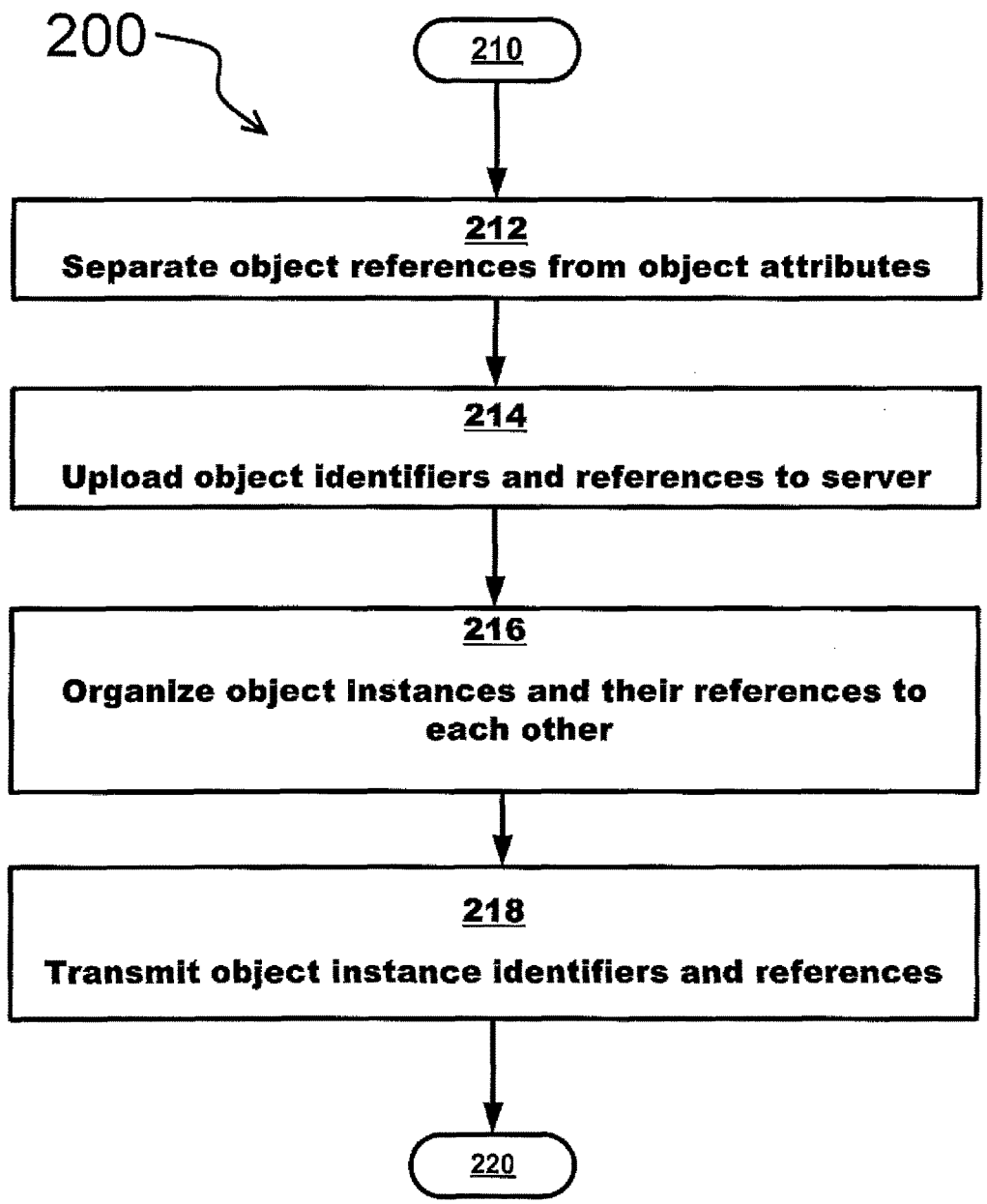
FIG. 2 illustrates a flow chart for opening a secure data structure.

FIG. 2 illustrates a flow chart for opening a secure data structure 200. In the FIG. 2 a flow identifier 210 indicates the beginning of the process. At a step 212 object references are separated from object attributes. A secure server parses the object data structure by separating the attribute values from the object instances. The object instances can be rows in a relational database table, a spreadsheet, an XML document complex element, an EDI message, a Java object, a C# object, a record, or any other data object or structured data source.

The object may include references which incorporate other objects or pointers to other objects. The references can be explicit, such as the IDs of other objects and pointers to other objects. Or the references can be implicit by their being imbedded in an object such as an object "deep copied" into another object or a complex element that is deeper in a document or record hierarchy. If the objects instances do not have IDs, this process can assign each object instance a unique ID or GUID.

The parsing process creates a new data store of only object instance IDs and their references to other objects. It can optionally create a second data store of the object instance IDs and their attributes.

A parsing example using XML is shown below with the unencrypted data object and then again with four-digit IDs replacing the unencrypted information.

Original
<Clients>
<annual income>
<name>Richard VANDERDRIFT</name>
<income>$100,000</income>
<description>Successful Inventor</description>
<address>650 Main St.</address>
</annual income >
</Clients>

Obfuscated
<21EC>
<2020>
<3AEA>590A<A2DD>
<2B30>0800<1069>
<2121>FA66<309D>

<FA23 >12E2<1347>
<30FE>
<F09D>

One having skill in the art will see that instead of using 4 digit IDs, any length ID may be employed including 32 character GUIDs. Also, it will be apparent that the parsing step may be accomplished using a simple lookup table or more complex data structures. For example, common IDs such as "Name", "Address" and the like may use common IDs such that "Name" always has the same ID throughout the document. Alternatively, a higher level of parsing may be employed where each phrase, or even each letter uses a unique ID. Further still the "greater than," "less than" and slash character may also be replaced by IDs further obfuscating the data therein.

At a step 214 the object identifiers and references may be uploaded to a sever or other remote computing device. Since the IDs have replaced any meaningful data, there is no risk of data exposure to the owners of the server or any unauthorized user. At the request of a user or computer process, the data store with the object identifiers and references may be transmitted to either non-secure or optionally secure servers.

At a step 216 the object instances and their references are organized to each other into a data store. The non-secure and optionally secure servers organize the object instances into data structures that support such standard computer services as exporting, reporting, filtering, and analyses.

At a step 218 at the request of a user or computer process, the server transmits the organized data structures to one or more secure servers or non-secure servers.

At a flow marker 220 the process terminates.

Processing Changes to a Secure Data Store

Figure 3:
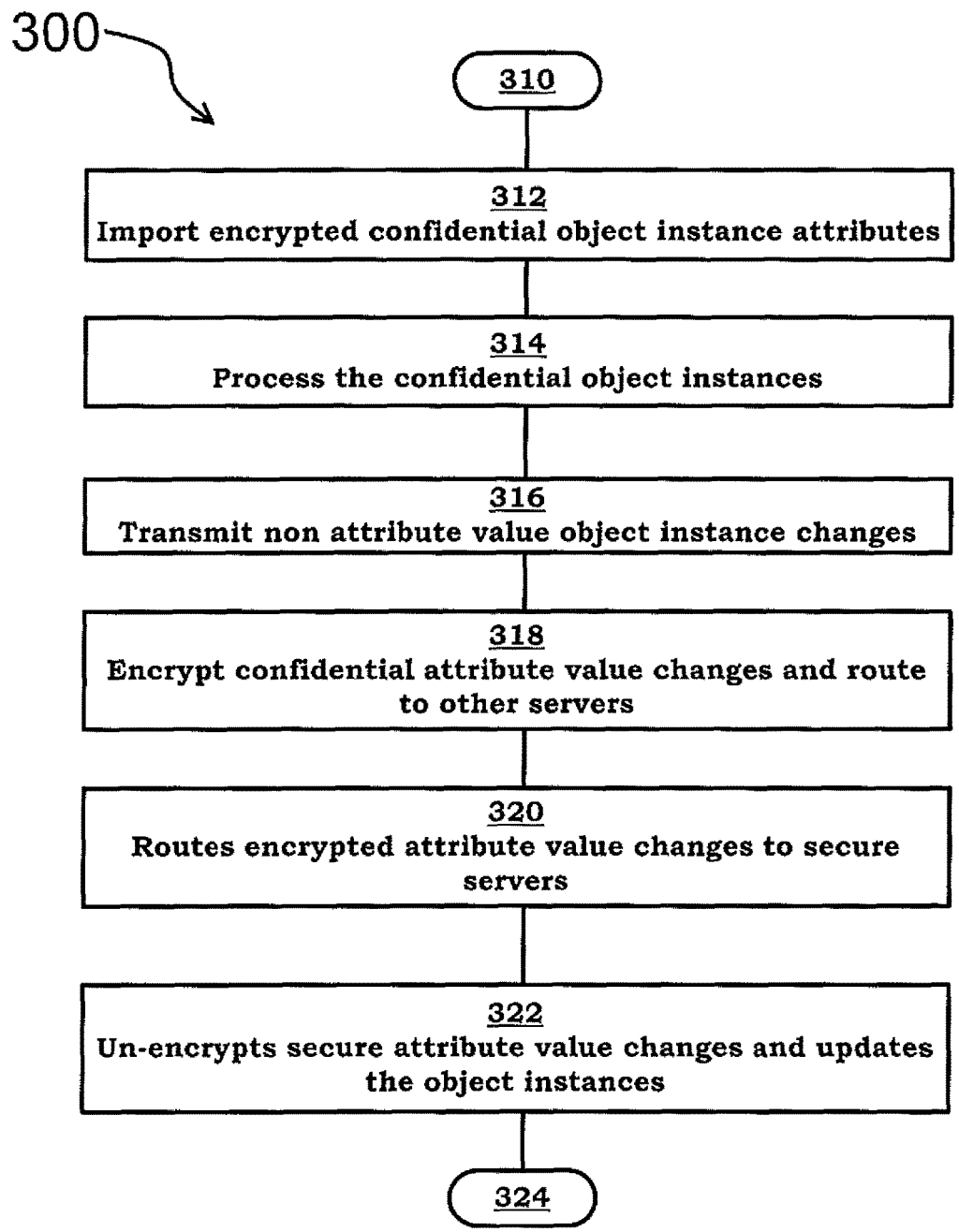
FIG. 3 shows steps for processing changes to a data store according to some techniques of the current disclosure.

FIG. 3 shows steps for processing changes to a data store according to some techniques of the current disclosure 300.

At a flow marker 310 the process begins.

At a step 312 encrypted confidential object instance attributes are imported. The appropriate elements and attribute values are held secure by the client. The secure client imports the data store with all the data or alternatively only the element or attributes value data, and updates each object instance with their appropriate values.

At a step 314 the confidential object instances are processed. Operations such as adding, updating, deletions and other and changes to object instances are processes that may occur on secure client servers.

At a step 316 the client transmits non-attribute value object instance changes. This step entails sending the IDs for new and deleted elements or objects to the remote systems. This step also involves sending send any changes to references from one object to another such as new, modified and deleted references.

At a step 318 the system encrypts confidential attribute value changes and routes them to other servers. The secure server encrypts and sends all element, structural or attribute value changes to non-secure servers and optionally other secure servers.

At a step 320 the system routes encrypted element and attribute value changes to secure servers. Here, a non-secure server that receives encrypted data changes from a secure client routes those encrypted data changes to its other secure client servers.

At a step 322 a secure client unencrypts the secure attribute value changes and updates the object instances.

At a flow point 324 the process terminates

Distributed Processing

One aspect of the current disclosure is its affect on the distribution of processing. For example a server may simply supply applets or functions to a client to operate on data kept completely on the client. In addition, the server could supply applets in response to the obfuscated data objects provided to the server. In some applications the objects may be partially obfuscated to allow the server to determine the appropriate code or applet to provide. Additionally, the server may reply to the client with different, or partially different, data in response to receiving the obfuscated data object. These aspects could be effectuated in many ways including, but not limited to the following examples.

A client may create an object wherein all the elements are replaced by IDs except for a few pertinent ones which remain in an unencrypted form. The server may then respond to the client according to what was contained in the object. The response may be in the form of an applet for processing data on the client, or the response may be in the form of a change to the object provided to the server.

One simple example may be selecting or sorting a list based on one or more unencrypted values. If a data object is provided to a server with all elements obfuscated except for the client's zip code, the server may respond by sorting the list by zip code. A more complex example would be where the server modifies the list by comparing the zip codes in the list with socioeconomic data accessible to the server but not the client. The server's response to the client may be to cull the list so that it only includes information from zip codes that meet predetermined socioeconomic criteria such as average income levels for the geographic area. The server would pool other resources to effectuate changes to the data object and return the data object to the client. This process occurring on a data object where some or all the elements are replaced by IDs.

In another alternative example, all the elements may be replaced by IDs such that only the structure of the data object is meaningful. The server or other remote device may receive the data object and recognize the purpose of the object in response to its structure. The server may then manipulate the data object and transmit it to the client or other device for processing. The server may also return to the client an applet or other code module for processing the data object and other associated data.

Shared Data

Another example showing the core concepts disclosed herein is data sharing among different medical and health provider entities. In this example a first client provides an object consisting of a partially obfuscated data object. For example, a data object containing a client number, and medical procedure that are not obfuscated. The data object is transmitted to a health provider who in turn adds billing formation and then transmits the data object to an insurance provider for payment.

When the insurer completes the transaction, they modify the data object and transmit it back to the health provider and to the client. The client then unencrypts the data for local storage on the client device.

Alternatively any of the entities could respond by processing the data object to change its structure or any unencrypted elements.

According to another alternative, any of the entities could respond by transmitting to the other entities machine-readable instructions or an applet for processing the un-encrypted data on the client. In this embodiment once the data object is received by the insurer, the insurer responds by transmitting to the client an applet that operates on the client's data to prepare a health record for payment processing and/or transmission to an appropriate processing department. The applet may operate on the IDs in the object or directly on unsecured data on the client device.

Alternative Embodiments

One having skill in the art will recognize that the systems and methods disclosed herein may be effectuated using other techniques. After reading this application, those skilled in the art would recognize that the scope and spirit of the invention includes other and further embodiments beyond the specifics of those disclosed herein, and that such other and further embodiments would not require new invention or undue experimentation.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

I claim:

1. A method, including steps of
receiving one or more set of data structures from one or more client devices at a server device, wherein said server device maintains said set of data structures in a format inaccessible to unauthorized users of said set of data structures;
sending, one or more times, particular sets of data object instances from said one or more client devices to the server device, said sets of data object instances having an organization in a data structure;
at said server, causing each said set of data object instances from said client device to be operated on in accord with a set of data management rules, said steps of causing to be operated including supplying one or more applets to the client device, the applets operating at the client device to operate on one or more data object instances at the client device;
wherein, in response to said requests from said one or more client devices, performing an operation on said server device, wherein said operation changes a relationship of said plurality of data object instances to said data structure without changing attribute values of said data object instances,
sending a result of said steps of performing the operation to said client device,
wherein said steps of supplying one or more applets are performed in response to receiving partially obfuscated data object instances at said server,
wherein the server determines a particular set of applets to supply in response to said non-obfuscated portions of said partially obfuscated data object instances.

2. A method as in claim 1, including steps of
receiving, on a processor-controlled client device, said plurality of data object instances; generating a second organization having a data structure including said plurality of data object instances having been revealed.

3. A method as in claim 1, wherein
said being hidden includes being encrypted or obfuscated.

4. A method as in claim 3, wherein
said being obfuscated includes replacing said plurality of said data object instances to be hidden with unique identifiers.

5. A method as in claim 1, wherein
said data object instances include entries and said data structure includes a relational database table.

6. A method as in claim 1, wherein said data structure includes an XML file.

7. A method as in claim 1, wherein
said data object instances include database tables and said data structure includes a relational database.

8. A method as in claim 2, wherein
said portion of said plurality of data object instances that is hidden includes said organization of said data structure.

9. A method as in claim 2, wherein
said portion of said plurality of data object instances that is hidden includes a set of attribute values of said data object instances.

10. A method as in claim 1, wherein
the applets operate at the client device on data object instances completely maintained at the client device.

11. A method as in claim 1, wherein
said steps of supplying one or more applets are performed in response to receiving obfuscated data object instances at said server.

12. A method as in claim 1, wherein
said steps of causing to be operated include steps of
supplying at least partially modified data object instances to the client device with said one or more applets,
wherein the client device executes or interprets the applets on the partially modified data object instances.

* * * * *